UNITED STATES PATENT OFFICE.

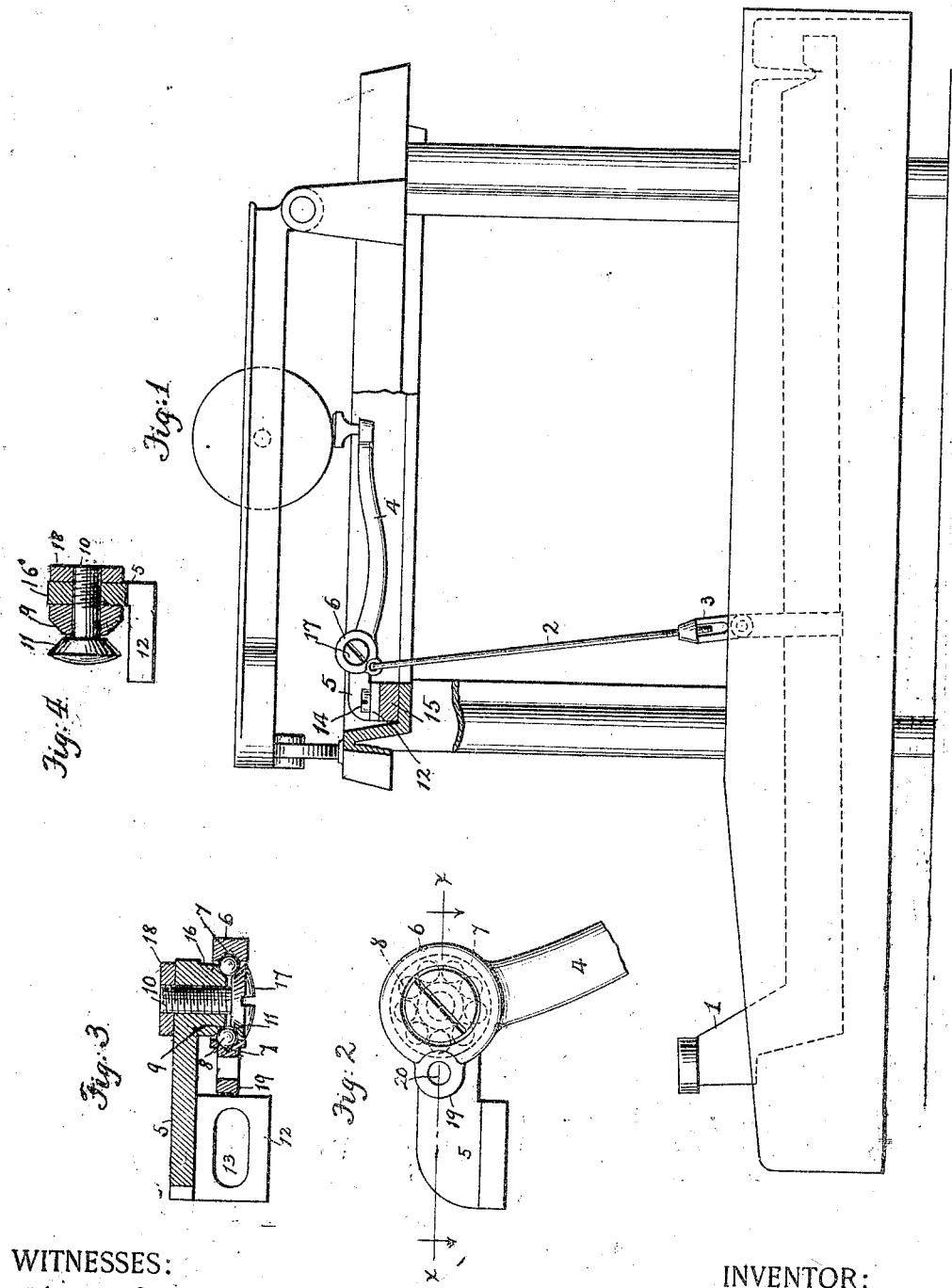

CHARLES H. SHEPARD, OF BROOKLYN, NEW YORK, ASSIGNOR, BY MESNE ASSIGNMENTS, TO REMINGTON TYPEWRITER COMPANY, OF ILION, NEW YORK, A CORPORATION OF NEW YORK.

TYPE-WRITING MACHINE.

1,092,406.   Specification of Letters Patent.   Patented Apr. 7, 1914.

Application filed October 1, 1896. Serial No. 607,514.

*To all whom it may concern:*

Be it known that I, CHARLES H. SHEPARD, citizen of the United States, and resident of Brooklyn, in the county of Kings and State of New York, have invented certain new and useful Improvements in Type-Writing Machines, of which the following is a specification.

My invention in typewriting machines relates to ball bearing type bars, and my main objects are to provide a simple and cheap though effective construction and one in which only a single row of balls is employed and in which the bearing surfaces may be increased in size without increasing the width of parts at the joint or bearing or using more space for the hanger and type bar.

To these and other ends which will hereinafter appear my invention consists in certain features of construction and combinations of devices which will be hereinafter more fully described and particularly pointed out in the appended claims.

In the accompanying drawings:—Figure 1 represents a side elevation, partly in section, of a Remington typewriting machine embodying my invention. Fig. 2 is an enlarged side elevation of a type bar ball bearing construction embodying my improvement, the type bearing end of the bar being broken away. Fig. 3 is a horizontal section taken at the line $x, x,$ of Fig. 2; and Fig. 4 is a vertical section illustrating a modification of my invention.

In the various views the same parts will be found designated by the same numerals of reference.

1 designates the key lever, 2 the connecting rod attached thereto by means of a coupling 3, 4 the type bar or lever, provided in this instance with two types, but which of course may have only one type or more than two types, and 5 is a bracket or hanger for supporting the type bar or lever.

The type bar is formed or provided with an eye or ring 6 of such width or thickness transversely as to enable the formation therein interiorly of a continuous or circular V-shaped groove 7 to serve as a bearing for a row or set of small anti-friction balls 8, as shown more clearly at Fig. 3.

The type bar hanger or bracket is formed or provided with a beveled surface 9, and a screw 10 is also provided with a beveled surface 11, the said surfaces 9 and 11 being inclined in opposite directions and opposing the beveled or inclined surfaces of the V-shaped groove 7, to afford likewise suitable bearings for the set or row of anti-friction balls.

The hanger 5 may be provided with a lateral base 12, slotted at 13 to enable it to be adjustably attached by a screw 14 to the type plate or ring 15 of the machine, and the said hanger in the example shown at Fig. 3 may also be formed with an integral lateral circular boss or hub 16 which extends into the eye and upon whose inner or free end the beveled or inclined surface 9 is formed.

The circular inclined bearing surface 11 is formed on the under side of the head 17 of the screw 10, and the shank of said screw engages with a threaded perforation extending through the hanger and through the boss 16, a set nut 18 being screwed on to the end of the shank to prevent the screw from working loose. The axis of the screw is the pivotal axis of the type bar when the latter, the hanger and the bearing or joint are assembled in combination, and coincides with the axis of each of the annular bearing surfaces 9 and 11.

The eye or ring 6 of the type bar as shown at Fig. 3 admits both the annular beveled bearing 9 and the annular beveled bearing 11, since said eye or ring is interiorly of a greater diameter than both said bearings. The bearings 9 and 11 form together a circular V-shaped groove disposed in opposition to the V-shaped groove 7 of the type bar, and hence by means of such pair of grooves, which together form the channel of a raceway, the balls are held firmly in proper working position, and the type bar is capable of swinging or vibrating freely yet truly upon and about said balls, which are free to move and revolve in said raceway.

By means of the screw or bolt the bearing surfaces may be readily adjusted in the first instance to enable the type bar to swing accurately and with the proper or desired freedom, and after use when wear occurs the screw or bolt may be turned or moved in to the required extent to take up the wear or effect the necessary readjustment of the bearings, the screw and its counterpart constituting means to keep the axis of said bearing surface or annular wall 11 constantly in coincidence with that of the bearing surface or annular wall 9 and the pivotal axis of the type bar; hence the type bar is at all times prevented from shaking sidewise or wabbling and the alinement of the impressions is consequently maintained.

The ring or eye 6 may be formed with an integral ear 19, which may be perforated at 20 to receive the upper end of the connecting rod 2, by which the type bar is vibrated when the key lever is actuated. I have shown such ear as located in rear of the bearing ring itself, since in the machine shown the types are raised to the platen by a down movement of the connecting rod, but of course, if such movement of the type bars should be effected by a thrust movement of the connecting rod, such rod would have to operate on the type bar in front of the bearing ring or between the said ring and the types, and in such case the perforated ear would have to be located in advance of the ball bearing joint instead of behind it, as shown; or for that matter, the perforated ear might be dispensed with and the connecting rod be attached directly to a hole in the type bar itself.

It will be observed that the ball bearings occupy but little space transversely, and hence a greater number of bars to a given sized type ring may be provided than in the older constructions wherein the type bars have two lateral pivots and are attached to bifurcated hanger arms. As the bearings occupy vertical planes they may be made of comparatively large diameter without thereby necessitating any reduction in the number of type bars, since the width of the parts need not be increased in accordance with the enlargement of the diameters of the bearings. The balls employed are quite small in diameter and the number of them employed will of course vary with the size or diameter of the bearings.

Referring to Fig. 4, the only change in construction shown thereat consists in making the boss or hub 16 of a separate piece in lieu of forming it integral with the vertical bar portion of the hanger 5.

From the foregoing and from the drawings, it will be seen that one of the bearings 11 for the anti-friction balls is adjustable independently of the type bar and of the hanger and in parallel planes; that the bearings 9 and 11 constitute a hub which is set within the eye or bearing of the type bar; and that said hub and said eye form between them a ball race, one of the walls of which comprises a separable plate which is adjustable to planes parallel with the plane of the ball race. It will also be understood that the bearing in the type bar provides an annular ball race or groove which is opposite to the ball race or groove formed by the bearings supported by hanger and that the type bar moves around the series of interposed balls in the median plane of said ball races or the balls contained therein, and that the point of connection between the type bar and the connecting link is likewise in said median plane. It will also be observed that the head 17 of the screw constitutes essentially a plate which forms a side wall of one of the ball races, and that it is adjustable to different planes parallel with the plane of the ball race, considered as an entirety, so that in the adjustment of the bearing an even pressure may be effected and so that the type bar will swing freely and without binding, irrespective of the adjustment of the bearings. The stem of the screw is supported in the threaded mount or boss 16 whereby, it will be seen, the plate 17 is adjustably threaded on said mount.

Numerous changes in detail construction may be made without departing from the gist of my invention.

What I claim as new and desire to secure by Letters Patent, is:—

1. In a typewriting machine, the combination of a type bar support, a type bar, and a joint consisting of parts that form a raceway and of a set of balls confined therein, the channel of the raceway being two grooves, one of these grooves having two walls each of which forms an annular bearing-surface, and said joint including means to render adjustable the part which forms one of said annular bearing-surfaces and to keep the axis of that bearing-surface constantly in coincidence with the axis of said other bearing-surface and the pivotal axis of the type bar.

2. In a typewriting machine, the combination of a type bar support, a type bar, and a joint consisting of parts that form a raceway and of a set of balls confined therein, the channel of the raceway being two grooves, one of these grooves being formed in the type bar and the other having two annular walls formed by parts of the joint which connect the type bar and balls with said support, one of these parts being movable toward and from the other, and said joint including means to control the adjustment of said movable part and to keep the axis of its annular wall constantly in coincidence with the axis of said other annular wall and the pivotal axis of the type bar.

3. In a typewriting machine, the combination of a type bar support, a type bar, and a joint consisting of parts that form a raceway and of a set of balls confined therein, the channel of the raceway being two grooves, one of these grooves having two annular walls one of which is formed on a screw-threaded part, this annular wall and the screw of this part having a common axis, and said screw and its counterpart constituting means to keep said axis constantly in coincidence with the axis of said other annular wall and the pivotal axis of the type bar.

4. In a typewriting machine, the combination of a type bar support, a type bar, and a joint consisting of parts that form a raceway and of a set of balls confined therein, the channel of the raceway being two grooves, one of these grooves being formed in the type bar and the other having two annular walls formed by parts of the joint which connect the type bar and balls with said support, one of these parts being a screw the axis of which coincides with that of the annular wall of this part and said screw and its counterpart constituting means to keep said axis constantly in coincidence with the axis of said other annular wall and the pivotal axis of the type bar.

5. In a typewriting machine, the combination of a type bar support, a type bar, and a joint consisting of parts that form a raceway and of a set of balls confined therein, said parts having annular walls which have a common axis that coincides with the pivotal axis of the type bar, one of these parts being secured in place by a threaded connection the axis of which coincides with the aforesaid axis, and said threaded connection constituting means to enable this part to be adjusted with relation to another of said parts, and to keep the axis of its annular wall coincident with the aforesaid axis irrespective of the position in which the part may be adjusted.

6. In a typewriting machine, the combination of a type bar support, a type bar, and a joint consisting of parts that form a raceway and of a set of balls which are confined therein and through which passes the median plane of the type bar, said parts having annular walls which have a common axis that coincides with the pivotal axis of the type bar, one of these parts being secured in place by a threaded connection the axis of which coincides with the aforesaid axis, and said threaded connection constituting means to enable this part to be adjusted with relation to another of said parts, and to keep the axis of its annular wall coincident with the aforesaid axis irrespective of the position in which the part may be adjusted.

7. In a typewriting machine, the combination of a single armed type bar hanger, a type bar, and a joint consisting of parts that form a raceway and a set of balls confined therein, the channel of the raceway being two grooves, one of these grooves being formed in the type bar and the other having two annular walls formed by two parts of the joint which connect the type bar and balls with the hanger, one of these two parts being a screw which extends into the other part and the axis of which coincides with that of the annular wall on the screw, and said screw and its counterpart constituting means to keep said axis constantly in coincidence with the axis of said other annular wall and the pivotal axis of the type bar.

8. The combination of a type bar hanger, a type bar, one of said type bar and type bar hanger members having an eye and the other of said members having a hub within said eye, said eye being in the median plane of the type bar, a ball-race, and anti-friction balls between said hub and eye, one of the walls of said ball-race being formed of a separable plate adjustable against the balls and to planes parallel with the plane of said race to compensate for any wear or undue looseness that may take place between the balls and the bearings therefor.

9. An anti-friction bearing for type bars comprising a hanger provided with an annular ball-race, and a type bar pivoted to swing in the median plane of said ball-race and provided with an annular ball-race arranged opposite the ball-race of the hanger, the side wall of one of said ball-races being formed of a plate separate from the body of said hanger or of said type bar and adjustable to different planes parallel to the plane of the ball-race and means independent of the balls for holding said plate in adjusted position.

10. An anti-friction bearing for type bars comprising a hanger provided with an annular ball-race, a type bar pivoted to swing in the median plane of said ball-race and provided with an annular ball-race arranged opposite the ball-race of the hanger, the side wall of one of said ball-races being formed of an adjustable plate and a mount whereon said plate is adjustably threaded.

Signed at New York city, in the county of New York and State of New York this 30th day of September A. D. 1896.

CHARLES H. SHEPARD.

Witnesses:
D. S. RITTERBAND,
JACOB FELBEL.